`United States Patent` [19]

Datta et al.

[11] 3,915,252

[45] Oct. 28, 1975

[54] POSITIVE LUBRICATION SYSTEM FOR FINAL DRIVE HOUSING OF A SKID STEER LOADER

[75] Inventors: Arthur S. Datta, Willow Springs; R. Dale Moore, Aurora; David G. Owens, La Grange, all of Ill.

[73] Assignee: International Harvester Company, Chicago, Ill.

[22] Filed: Mar. 29, 1974

[21] Appl. No.: 456,415

[52] U.S. Cl. .................... 180/72; 74/230; 74/467; 184/6.2; 184/11 R; 184/13 R; 180/24.05
[51] Int. Cl.² ........................................ B60K 17/04
[58] Field of Search .......... 180/24.05, 72, 70, 33 B; 74/230, 467; 184/6.2, 11 R, 13 R, 106

[56] References Cited
UNITED STATES PATENTS

| | | | |
|---|---|---|---|
| 1,151,271 | 8/1915 | Johansson | 74/467 X |
| 1,563,741 | 12/1925 | Good | 74/467 |
| 2,422,460 | 6/1947 | Armington | 180/24.05 |
| 2,824,615 | 2/1958 | Lado | 180/24.05 |
| 2,938,601 | 5/1960 | Brafford | 184/6.2 X |
| 3,035,651 | 5/1962 | O'Quinn | 180/24.05 X |
| 3,214,989 | 11/1965 | Wellauer et al. | 74/467 X |
| 3,601,515 | 8/1971 | Pelizzoni | 74/467 X |

*Primary Examiner*—Leo Friaglia
*Assistant Examiner*—John P. Silverstrim
*Attorney, Agent, or Firm*—William H. Wendell; Floyd B. Harman

[57] ABSTRACT

Final drive housings which carry the wheels and are pivotally mounted to the frame of the vehicle also serve as a receptacle for lubricant. The volume of lubricant allows some of the wheel driving final drive system to be in direct contact with accumulated lubricant and an arrangement of channels and collecting means take advantage of splashed lubricant to provide the remainder of the system direct contact with accumulated lubricant.

1 Claim, 3 Drawing Figures

POSITIVE LUBRICATION SYSTEM FOR FINAL DRIVE HOUSING OF A SKID STEER LOADER

This invention relates to skid steer loaders and, more particularly, to a lubrication system for the final drive housings or bogies.

There are numerous vehicles of the skid steer tractor type construction designed to perform various material handling operations. The manueverability of such vehicles is obtained, by providing a construction wherein one set of wheels may be braked or even driven backwards while the other set is driven forward. Additional mobility is achieved by pivotally securing the final drive housing to the frame of the vehicle. This allows the wheels secured to the final drive housing to go over obstacles without the vehicle's frame, etc. being tied to the movement thereof.

As a result of the vehicle's mobility and pivoting nature of the final drive housing, difficulty is encountered in keeping the sprocket, chain, gears, etc. means contained therein properly lubricated. That is, the housing comprises a receptacle in which are found the above-mentioned force transfer means, all of which must be properly lubricated. It is apparent the entire volume of the final drive housing could be filled with lubricating fluid, however, this would prove to be expensive and also, add to the overall weight of the vehicle. It is also apparent and was the typical arrangement prior to the present invention that the gear reduction required for the final drive could be contained in a separate lubricant containing housing. However, this design has greater complexity due to the additional support elements required, and will also increase the weight and cost of the vehicle.

Therefore, it is an object of this invention to provide a final drive housing having a positive lubrication system. A further object of this invention is to provide a channel and collection means whereby fluid can be accumulated. A further object of this invention is to provide a final drive housing wherein all sprockets and gears are lubricated. Still another object of this invention is to provide a channel and collective means associated with a sprocket means whereby lubricant in the final drive housing can be minimized.

In accordance with the invention a hydrostatic skid steer tractor is provided with a final drive housing or bogie means. The bogie means is pivotally secured to the vehicle and includes a series of sprocket means in a triangular relationship. That is, one being higher than the remaining two. These sprockets and associated chain means are carried in the receptacle part of the bogie which also contains lubricant. The lubricant level is such that the lower two sprockets and associated chains are in direct contact with the accumulated lubricant. Thus, they do not depend on splash, etc. for their lubricant supply. The third sprocket is carried above the level of the lubricant and depends for lubrication upon the chain which carries lubricant with it as it leaves the lower portion of the case. A channeling means and collecting means positioned adjacent to the sprocket means accumulates lubricant whereby it is accessible to a gear and pinion assembly located in the upper regions of the bogie.

Other objects and advantages of the invention will become apparent upon reading the following detailed description and upon reference to the drawings in which.

While the invention will be described in connection with the preferred embodiment, it will become understood that it is not intended to limit the invention to that embodiment. On the contrary, it is intended to cover all alternatives, modifications, and equivalents as may be included within the spirit and scope of invention as defined above by the appended claims.

Figure 1:
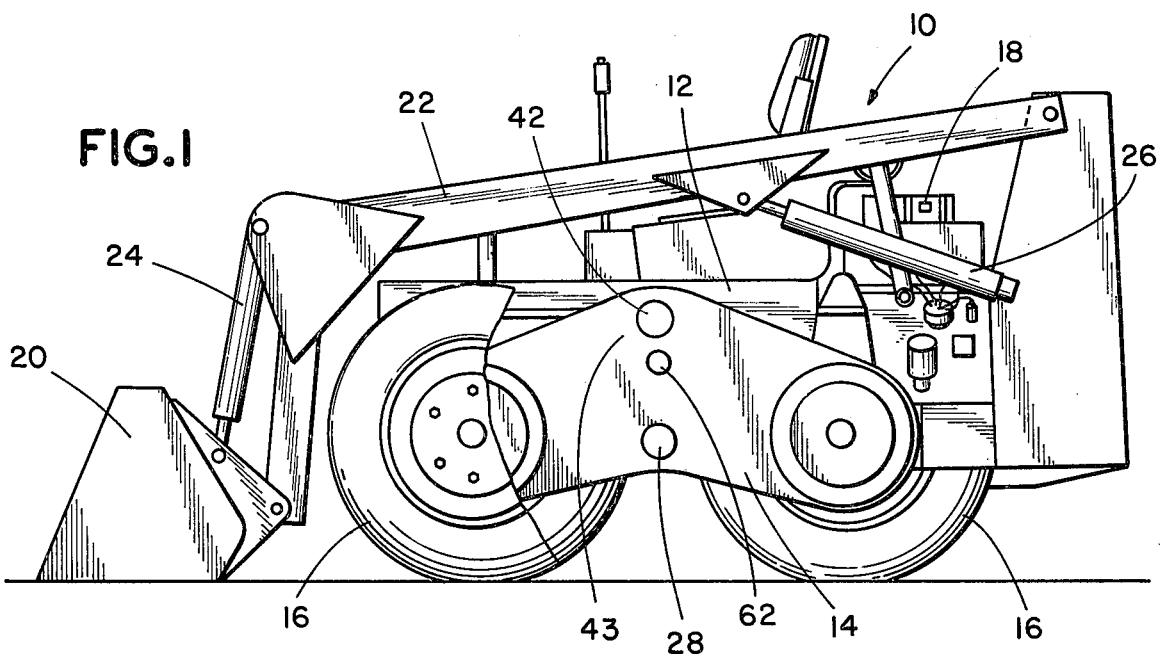
FIG. 1 is a side view of a skid steer vehicle wherein the invention is incorporated.

Referring now to the drawings and more particularly to FIG. 1 wherein is illustrated a skid steer type vehicle means designated by the number 10. Skid steer vehicle means 10 includes a frame or chassis means 12 upon which is mounted a first and second final drive housing means 14, each of which in turn mount a series of wheel means 16. In FIG. 1 only one side of the vehicle is shown but it is understood the other side is identified and thus discussion will be limited to final drive housing means 14. The wheel means 16 are adapted to operate in either a forward or reverse manner, power being delivered thereto by engine means 18 via a hydrostatic connecting means and sprocket means as will hereafter be more fully discussed. The engine means 18 is of a suitable design and is mounted on the chassis or frame 12 and operates a plurality of hydraulic pumps (not shown) which in part make up the force connecting means 19. Associated with the vehicle is a bucket means 20 secured to a boom means 22 which is in turn pivotally secured to the frame means 12. A series of hydraulic means 24 and 26 employed are to actuate the boom and bucket means. A shaft means 28 is fixed to and passes through the frame whereby both bogies are secured fixed to the frame 12 thereto. This type of skid steer vehicle is well known in the art and a vehicle made by International Harvester known as the 3200 Series A Loader Tractor is typical of the units which utilize separate gear housing configuration.

Figure 3:
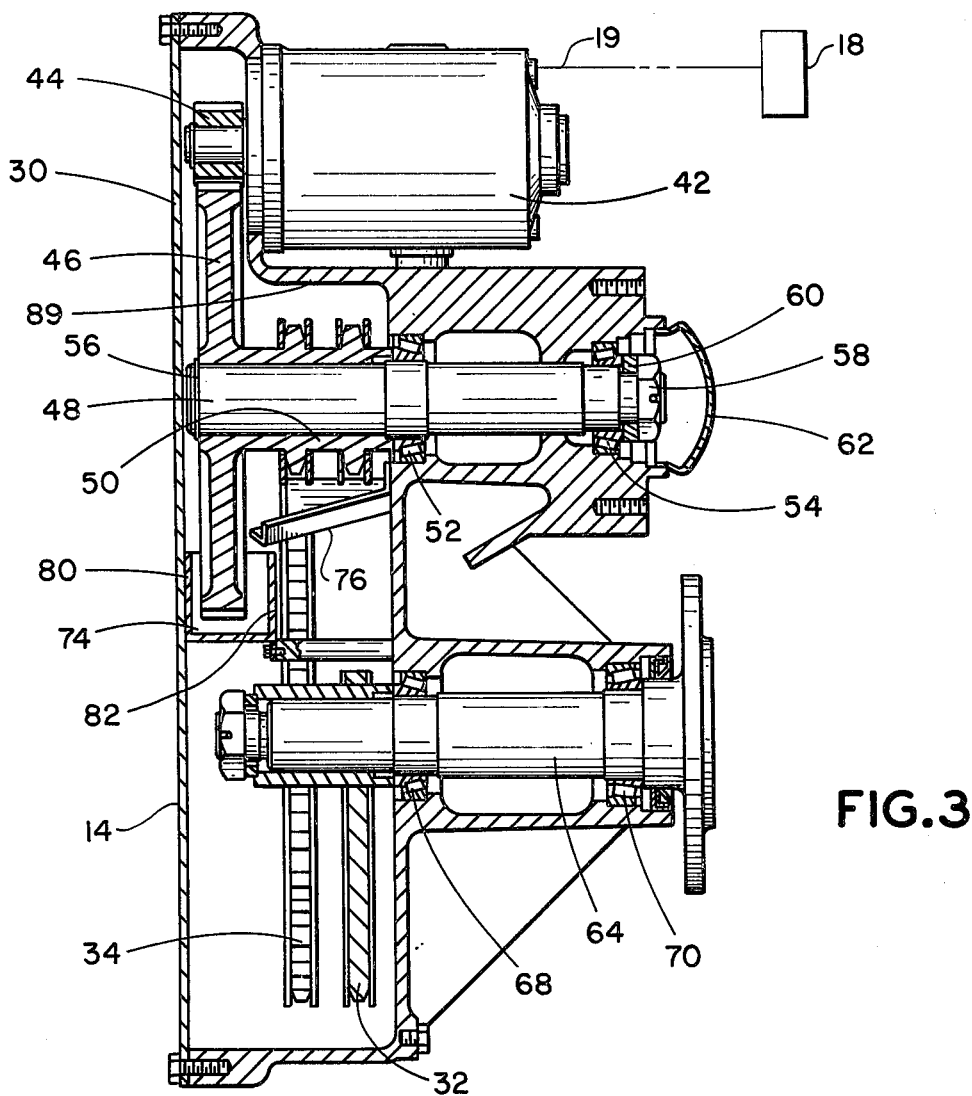
FIG. 3 is a sectional view of FIG. 2 as seen on line 3.
Figure 2:
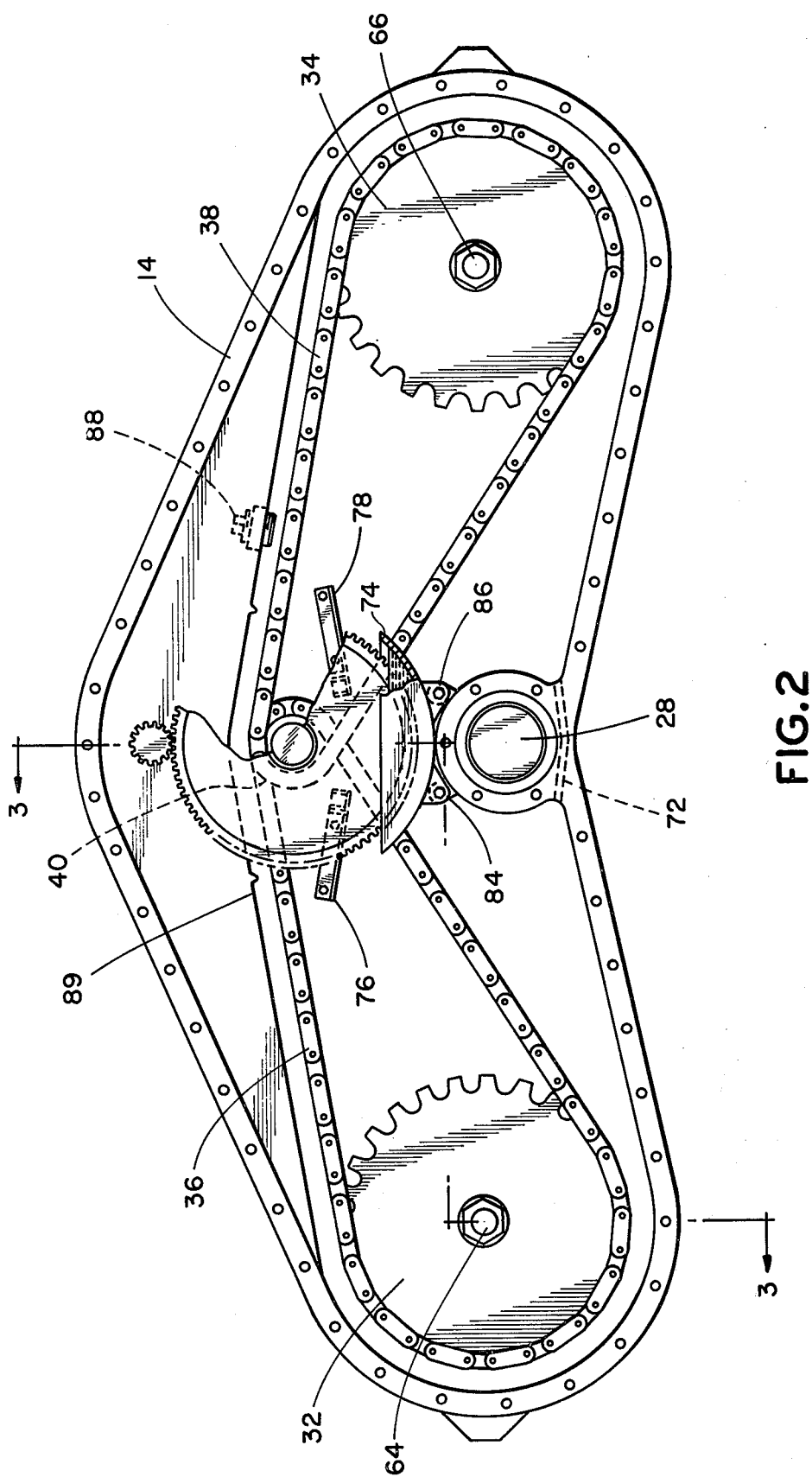
FIG. 2 is a partial view of one of the final drive housing or bogie means having portions cutaway more fully to illustrate the invention.

Referring now to FIGS. 2 and 3 wherein the positive lubrication system is more fully disclosed. The bogie or final drive housing means 14, the rear of which is shown in FIG. 2 with plate means 30 as shown in FIG. 3 removed, is basically a large receptacle means. It is standard procedure to fill the receptacle with sufficient fluid such that first sprocket means 32 and second sprocket means 34 have access to or are at least immersed in accumulated lubricant. Additional fluid must be provided such that the action of the sprocket means as well as chain means 36 and 38 provide sufficient splash agitation to lubricate third sprocket means 40 driven, gear 46, and pinion gear 44. The lubrication problem is further aggravated when the vehicle is operated in a position wherein the lubricant can all accumulate on one side of the final drive housing means 14, such as on a hillside. Power is transmitted to the wheel means 16 from hydrostatic motor means 42 mounted on the top section 43 of the bogie means 14. Power being delivered to the hydrostatic motor via appropriate hydraulic lines (not shown) from the engine driven pump means (not shown) mounted on the vehicle. Force is transmitted by hydrostatic motor means 42 through pinion gear 44 driven, gear 46 to drive shaft means 48. A twin sprocket means 50 is mounted on drive shaft means 48 whereby force is transferred therebetween. The shaft means 48 is supported by tapered roller bearing means 52 and 54. A snap ring means 56 being employed to securely hold gear means 46. As is apparent the snap ring means 56 prevents movement to the left of shaft means 48 while the angles of bearing means 54 prevent movement of the shaft to the left. Bearing means 54 being held in position by threaded bolt means 58 exerting force against a spacer means 60 which in turn presses against the bearing means 54. A hub cap means 62 is secured over the entire assembly to keep out dirt and to prevent the loss of lubricant. The chain means 36 and 38 transmit rotational movement to the sprocket means 32 and 34. They in turn drive first spindle means 64 and second spindle means 66. The spindle means as represented by spindle means 64 are supported by tapered roller bearing means 68 and 70 whereupon the driving wheels 16 are mounted.

The shaft means 28 which holds the bogie means to the frame of the vehicle also creates a barrier against the movement of fluid from one end of the bogie means to the other. That is, if the skid steer vehicle is operating up a hillside such that the lubricant moves away from sprocket means 32 and toward sprocket means 34, the barrier created by shaft means 28 will prevent all of the fluid from collecting in the area of sprocket means 34. Bore means 72 positioned under shaft means 28 allow the passage of fluid from one side to the other; however, the diameter of these bore means is such that rapid lubricant passage is not possible. That is, fluid can flow from one side to another to equilibrants the volumes surrounding either sprocket when the vehicle is in a relatively level position; however, if the vehicle has one side or the other suddenly elevated such as passage over a bump, raised area, etc. the barrier created by shaft means 28 prevents an immediate movement away from the sprocket. This combination of the barrier created by a shaft means 28 with the bore means series 72, having controlled diameters, allows equilibration of the lubricant on both sides of the bogie means, yet prevents the rapid movement of oil from one side to the other whereby one of the sprocket means could run dry.

Such provisions provide for supply of accumulated lubricant to first and second sprocket means 32 and 34. In order to provide for an accumulated source of lubricant for the driven gear 46 and pinion gear 44 without accessively filling the receptacle created by bogie means 14, collection means 74 and first and second channel means 76 and 78 are provided. It should be noted that if bogie means 14 was substantially filled with lubricant such that all of the sprocket means and gear means therein had available thereto a source of accumulated fluid, the parasitic losses would become substantial. That is, the sprocket and associated gears change etc. would create a paddle wheel like effect causing movement of the lubricant and an overall horsepower loss in the vehicle.

Collecting means 74 in the preferred embodiment is generally bow shaped with spaced apart parallel wall means 80 and 82. As shown in FIG. 3 driven gear 46 passes down into lubrication collecting means 74 such that lubricant can be picked up thereby and transferred to pinion gear 44. From a consideration of FIG. 3 it becomes apparent that the location of pinion gear 44 is such that lubricant splashed by the other sprocket means or the chain means would not come in contact therewith. Not only is collecting means 74 supplied with fluid through splashing etc. but channel means 76 and 78 accumulate further lubricant which is directed therein too. In the preferred embodiment collecting means 74 is secured to the final drive housing means 14 by a series of bolt and threaded hole means 84 and 86. Channel means 76 and 78 are secured to bogie means 14 in a similar manner. The bogie means casting 14 is also designed with protrusions or shelf means 89 which channel lubricant splashed onto bogie means 14 into channel means 76 and 78. The end of the generally trough shaped channel means is secured to bogie means 14 and is positioned such that runoff therefrom of lubricant will occur down into collecting means 74. The exact design of the collecting means or the channel means is not particularly critical, however, it is critical that the channel means are positioned such that they can direct sufficient lubricant to a collecting means which is so positioned and has such a volume that it can provide a source of accumulated lubricant to driven gear 46. It should be noted that lubricant in this particular embodiment is added to the receptacle within bogie means 14 through a capped hole means 88 or other suitably provided device.

There thus has been provided a hydrostatic skid steer tractor vehicle including a frame having an engine carried thereon and pivotally supporting a first and second bogie means. Wheel means are secured to the bogie means whereby the assembly functions in the nature of a walking beam arrangement. The bogie means are hollow and generally constitutes a receptacle wherein are carried first, second, and third sprocket means. A lubricant is poured into the receptacle such that a level is reached whereby the first and second sprocket means have access to accumulated lubricant. A motor means mounted on the bogie means transfers force from a hydrostatic pump which is in turn powered by the engine to gear means which transfer the force to the third sprocket means. Rotational force is transmitted between the sprockets by roll chain means. Lubricant is picked up on the chains as well as splashed by the first and second sprockets and chains such that it can be picked up by channel means and delivered to a collecting means. The collecting means is positioned such that gear means has an accessible source of accumulated lubricant and need not depend on splashed etc. lubricant in order to maintain a proper working order. A barrier means comprising the shaft whereby the bogie is secured to the vehicle's frame prohibits the rapid accumulation of all of the lubricant at one end of the bogie and for example it is going up a hill. However, bore means are provided therethrough such that when a level position is reached the lubricant levels on both sides of the barrier can equilibrate to the same level.

What is claimed is:

1. A positive lubrication system for the final drive of a hydrostatic skid steer tractor having a frame, an engine and a series of paired drive wheels operably connected to said engine and said frame, said system comprising:

means pivotally carried by said frame and rotatably mounting said drive wheels for force transmission from said engine to said wheels and for providing a receptacle to accommodate lubrication liquid required in said force transmission, said means comprising;

a bogie having an interior lower liquid storing volume;

lubrication liquid stored in said lower bogie storing volume;

an axle pivotally connecting said bogie to said vehicle frame adjacent the bottom of said bogie, having bore means therearound for equalization of liquid lubricant levels on either side thereof;

a motor carried by said bogie and operably connected to said engine;

means connecting said motor and said engine for force transmission therebetween;

lower sprocket means rotatably attached to said bogie within said liquid storage volume and rigidly connected to said wheels for force transmission to said wheels;

upper sprocket means rotatably mounted within said bogie above said first sprocket means and said lubrication liquid for force transmission to said lower sprocket means;

a chain operably connecting said first and second sprocket means;

gear means rotatably mounted within said bogie above said lower sprocket means and displaced axially from said upper sprocket means for force transmission from said motor to said upper sprocket means;

collection means attached to said bogie means in close proximity to said gear means for collecting lubricating liquid and exposing said gear means thereto; and channelling means attached to said bogie in close proximity to and below said upper sprocket means for directing the flow of said liquid lubricant to said collection means.

* * * * *